(12) United States Patent
Kanayama et al.

(10) Patent No.: US 6,342,982 B1
(45) Date of Patent: Jan. 29, 2002

(54) CARD READER

(75) Inventors: Yasuhiro Kanayama, Osaki; Hajime Oki, Hyogo, both of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/386,777

(22) Filed: Aug. 31, 1999

(30) Foreign Application Priority Data

Aug. 31, 1998 (JP) .......................................... 10-245571

(51) Int. Cl.⁷ .............................................. G11B 25/04
(52) U.S. Cl. ............................ 360/2; 360/88; 360/128; 360/240; 235/449
(58) Field of Search ................................. 360/2, 88, 128, 360/129, 240, 130.2, 130.3; 902/25, 27; 235/449, 380, 379, 439, 446, 475, 493

(56) References Cited

U.S. PATENT DOCUMENTS 5,698,832 A * 12/1997 Someya et al. ............. 235/449
6,042,010 A * 3/2000 Kanayama et al. ......... 235/449
6,176,426 B1 * 1/2001 Kanayama et al. ......... 235/449

FOREIGN PATENT DOCUMENTS

| JP | 8-279240 | | 10/1996 | | |
| JP | 9-269967 | | 10/1997 | | |
| JP | 10-198752 B1 | * | 7/1998 | ................... | 360/2 |

* cited by examiner

Primary Examiner—Alan T. Faber
(74) Attorney, Agent, or Firm—Wenderoth, Lind & Ponack, L.L.P.

(57) ABSTRACT

The card reader includes a main body 40 having a card passage 40A, a magnetic head for reading the information recorded on a card 30, an opening 42 provided in a card passage 41 of the main body 40, and an elastic member 100 for biasing the magnetic head 70 from an outward position to an inward position of the card passage 41 through the opening 42. Invasion preventing member 50, provided in close contact with the circumference of the magnetic head 70, is brought into contact with the main body 40. As a result, invasion of foreign material into the card reader main body circuit unit 110 including the magnetic head 70 from the outside is prevented.

14 Claims, 11 Drawing Sheets

CARD READER

FIELD OF THE INVENTION

The present invention relates to a card reader for reading data recorded on a card such as a magnetic card.

BACKGROUND OF THE INVENTION

A conventional card reader was designed for indoor use, and generally comprises a card passage provided in the main body, and an opening provided in the inner wall of the card passage. An elastic member for pushing from an outward position to an inward portion of the card passage, and a magnetic head unit integrated with this elastic member are placed in the opening. The magnetic head reads data recorded on a card. On the magnetic head-confronting side of the main body, there may be a circuit unit for processing the card data from the magnetic head.

FIG. 12 shows the shape of a conventional card reader main body. In the conventional card reader shown in FIG. 12, walls 46 (2 to 3 mm thick) are disposed at both sides of a card passage 41 for assuring stable running of the card. Both end portions 47 at which the card is inserted and passed through are shaped nearly at right angle to a mounting surface 48.

FIG. 13 is a side view showing a mounting state of the main body of a conventional card reader on an operation panel (hereinafter called unit panel) 120 of an automatic vending machine installed at a filling station or the like. It shows the arrangement of the main body and the unit panel of the apparatus in which the conventional card reader is assembled. Waterproof sheets 130 are adhered to both end portions 47 and ceiling 465 of the card reader main body, and it shows the mode of inserting the main body into the unit panel 120.

However, when such a conventional card reader is installed outdoors, it involves the following problems. Foreign material (water or other liquid, dust, etc.) may, invade inside through a gap between the main body opening and the magnetic head, or a gap at the junction between the main body upper surface and the unit panel in which the card reader is assembled. If foreign material deposits, adequate electric insulation in the terminals and circuits of the magnetic head may not be maintained. Therefore, the card data may not be read.

This problem may be solved by applying a waterproof coat of paint or sealant on the terminals of magnetic head, soldered parts of lead wires, and circuits. However, when assembling the card reader, this solution requires additional steps of applying the sealant, drying, and inspecting. In addition, if ice, dust or mud deposits on the spring for pressing the magnetic head, the spring guide, or the gap between the main body opening and the magnetic head, the motion of the magnetic head may be disturbed. Due to the disturbed motion, the card reader may not read the card data accurately.

As shown in FIG. 12 and FIG. 13, however, both end portions 47 of the conventional card reader are almost at right angles. The length of the unit panel 120 is defined to be $D_{120}$ and the dimension of the adhesion of the waterproof sheet to the card reader main body 40 is defined to be $d_{40}$. In this case, in order to prevent invasion of foreign material, the dimension $D_{120}$ must not be much larger than the dimension $d_{40}$. Accordingly, when mounting the card reader main body 40 on the unit panel 120, the waterproof sheet 130 is likely to be peeled or torn. Therefore, in the shape of the card passage of the conventional card reader main body, it was extremely difficult to adhere the waterproof sheet on the upper side of the main body card passage, and assemble the card reader by adhering the card reader to the unit panel.

SUMMARY OF THE INVENTION

The invention is intended to solve the aforesaid problems. It is hence an object thereof to present a card reader capable of preventing invasion of foreign material from outside the card reader into parts of the card reader other than the card passage of the card reader, and preventing impediment of motion of the magnetic head by invasion of foreign material. To achieve the object, the card reader of the invention comprises a main body, a magnetic head for reading the data recorded on a card, and a gasket to prevent invasion of foreign material (water or other liquid, dust, etc.) The gasket is placed so as to be in close contact with the periphery of the magnetic head, and also in close contact with the main body.

DESCRIPTION OF THE PREFERRED EMBODIMENT

Figure 1:
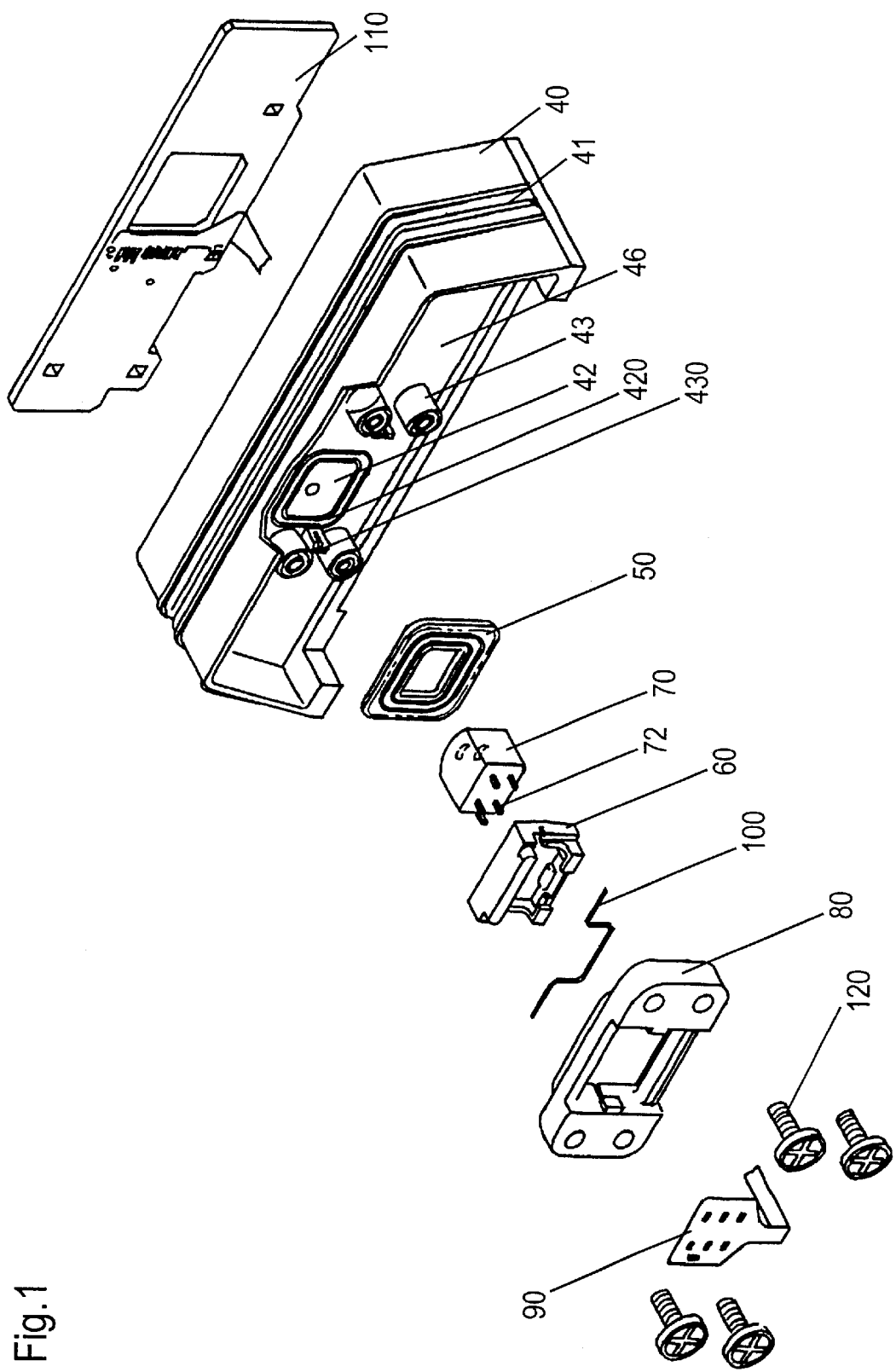
FIG. 1 is an explanatory diagram showing a constitution of a card reader in an embodiment of the invention.

An embodiment of the invention is described below while referring to the accompanying drawings. FIG. 1 is a perspective exploded view showing a constitution of a card reader in a first embodiment of the invention. In FIG. 1, a card reader 20 includes a card reader main body 40, a gasket 50 of elastic material such as rubber for preventing invasion of foreign material, and a head holder 60 for holding a magnetic head 70. A spring retainer 80 presses the gasket 50 to the main body and has a fulcrum for providing energy by a spring force. A lead wire 90, an elastic member (spring) 100, mounting screws 120, and a circuit unit 110 are also provided.

Figure 2:
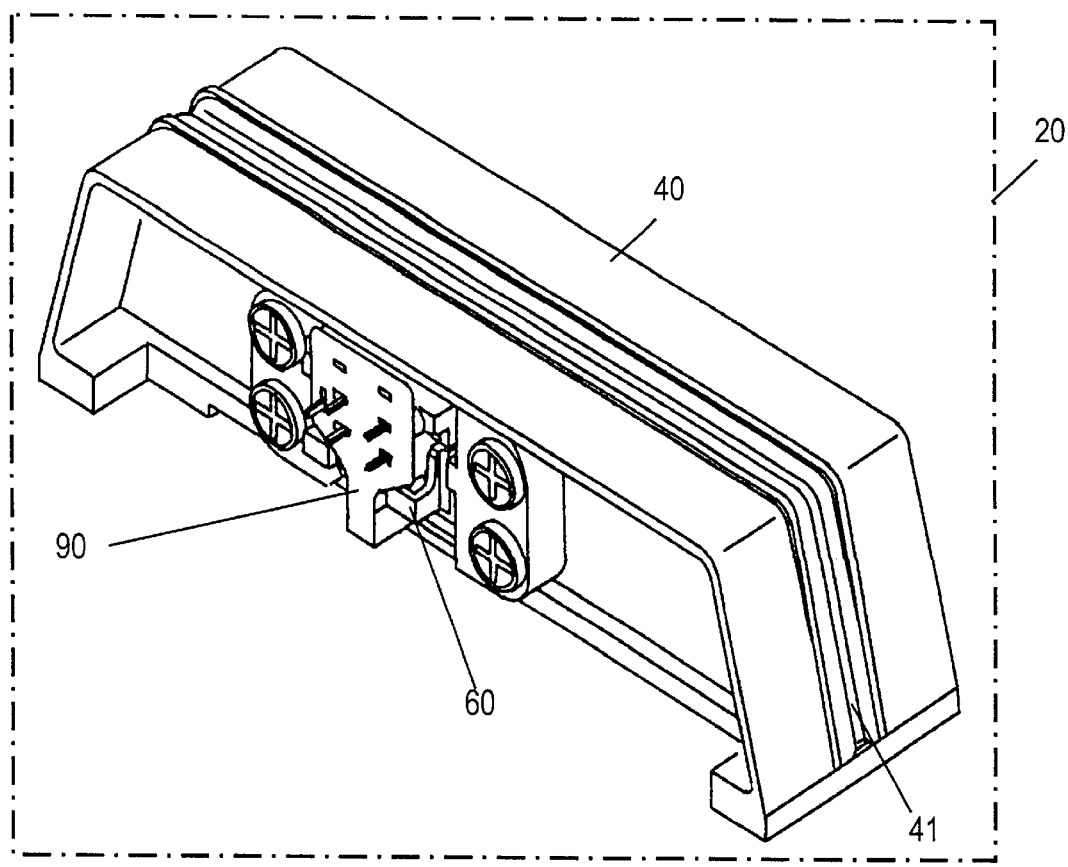
FIG. 2 is a diagram showing an assembled state of the card reader of the invention.
Figure 3:
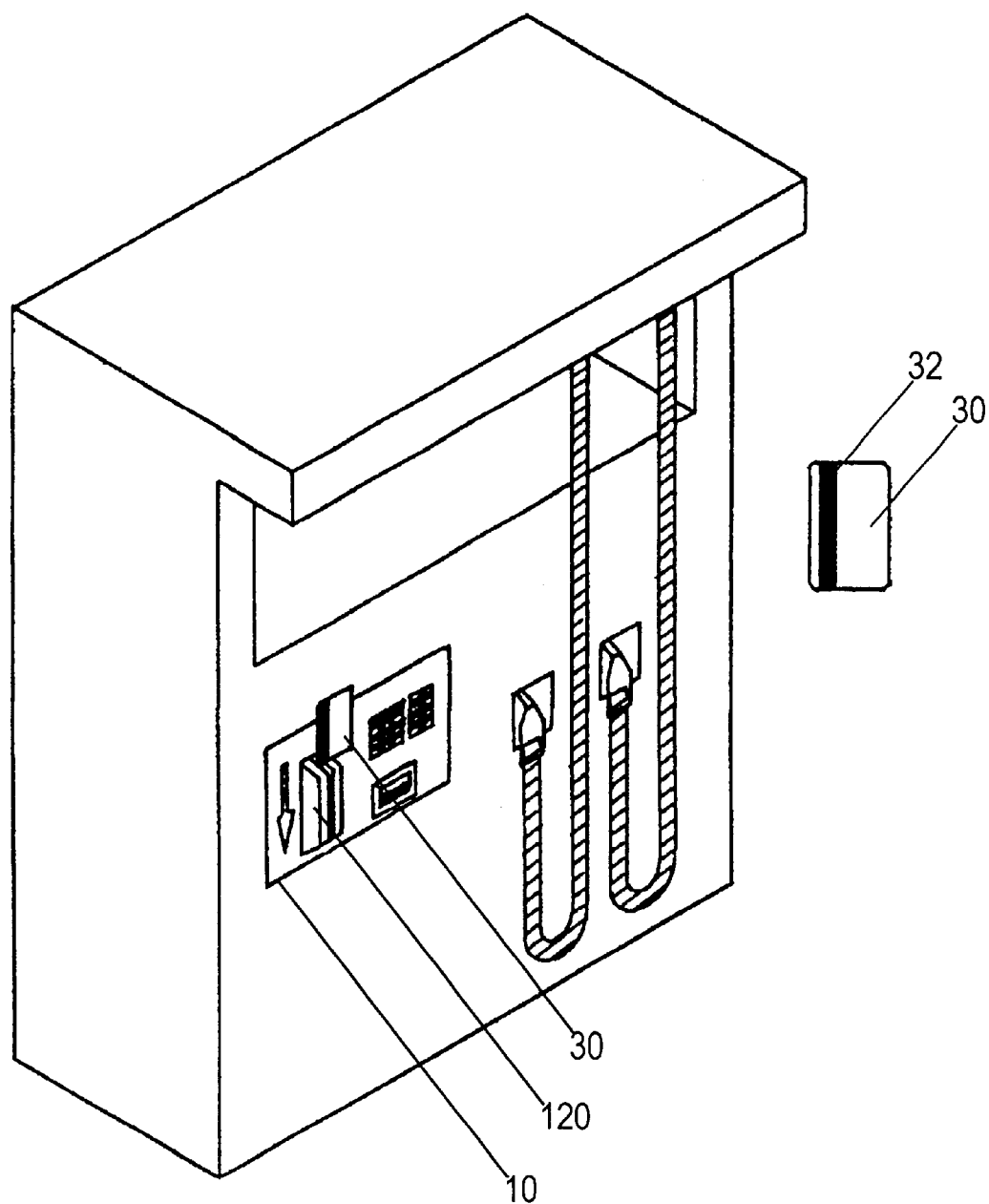
FIG. 3 is a diagram showing an operation panel using the card reader of the invention.

FIG. 2 is a perspective view of the card reader. It shows an assembled state of the card reader shown in FIG. 1. The card reader shown in FIG. 2 is used as assembled in other devices. FIG. 3 shows an example of the card reader installed in an operation panel 10 of an vending machine at a filling station or the like. When a card 30 passes through a card passage 41, the card reader 20 reads the data recorded on magnetic stripes 32.

In this constitution, the main body 40 is composed of a synthetic resin such as ABS, and has a passage 41 formed in the center for allowing the card to pass. At both sides of the card passage 41, guide walls 46 are provided for stabilizing running of the card, and the guide walls are orthogonal to a mounting surface of the card reader. A first guide wall 46 includes an opening 42 for inserting the magnetic head 70, a boss 43 for holding the mounting screws of the spring retainer 80, and a guide 430 of spring 100. A second guide wall 46 includes a boss (not shown) for holding the mounting screws of the circuit unit 110.

Figure 4C:
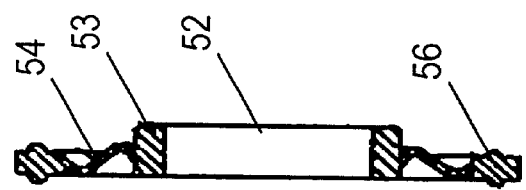
FIG. 4C is a side sectional view showing the gasket used in the card reader of the invention
Figure 4B:
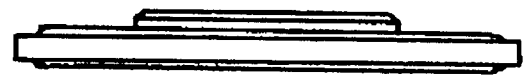
FIG. 4B is a side view showing the gasket used in the card reader of the invention.
Figure 4A:
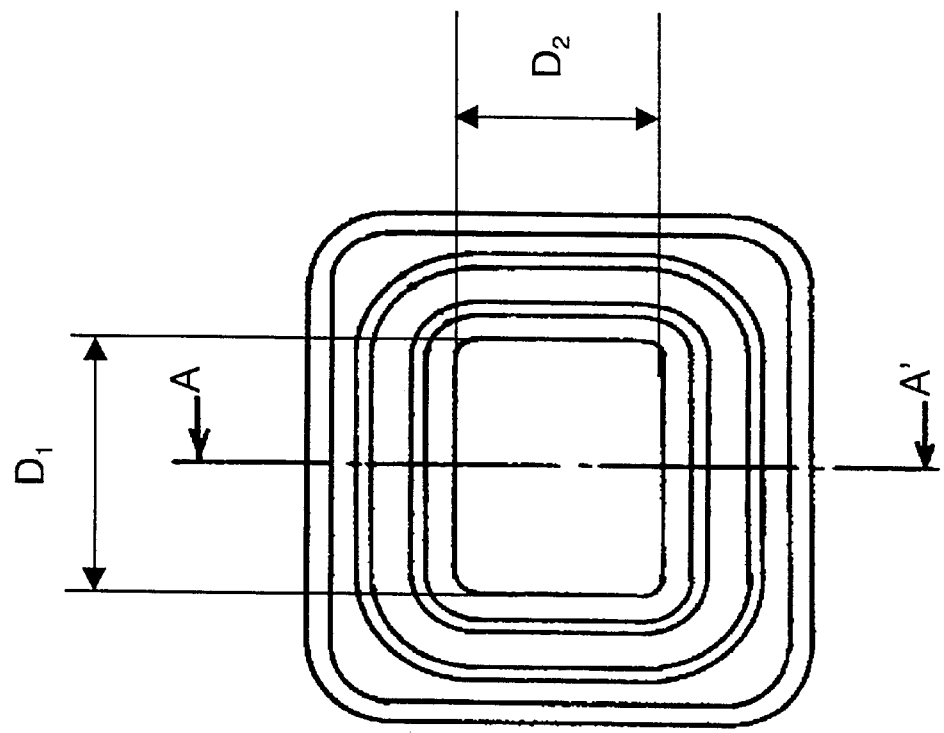
FIG. 4A is a front view showing the gasket used in the card reader of the invention.

FIG. 4A, FIG. 4B and FIG. 4C are explanatory drawings showing the gasket 50 used for preventing invasion of foreign material. FIG. 4A is a front view, FIG. 4B is a side view, and FIG. 4C is a side sectional view. Referring to FIG. 4A, FIG. 4B and FIG. 4C, the gasket 50 is made of an elastic member such as rubber, and the magnetic head 70 is inserted therein. The gasket 50 includes an opening 52 for allowing the leading end having the core of the magnetic head 70 to be exposed to the outside of the gasket 50, a magnetic head inserting portion (inner circumferential portion) 53, and a folding portion 54 for allowing smooth motion of the magnetic head when inserting or passing the card in the shape of the junction from the magnetic head periphery to the outer circumference. The wall thickness of the folding portion 54 is thinner than the thickness of the magnetic head inserting portion 53 or the outer circumferential portion 56. Further, as shown in FIG. 4A and FIG. 5A, the dimension of the opening 52 of the gasket 50 and the overall dimension of the magnetic head 70 are set in the following relation:

$D_1 < d_1$, $D_2 < d_2$.

The head holder 60 is composed of synthetic resin such as ABS, and has a portion for press-fitting and fixing the magnetic head 70, and a structure for nearly fixing the spring 100. The spring retainer 80 is composed of synthetic resin such as ABS, and protects the head holder 60, magnetic head 70, gasket 50, etc. The gasket 50 is placed between the spring retainer 80 and the peripheral edge portion 420 (see FIG. 1) of the opening 42 of the main body 40. The spring retainer 80 is inserted into four screw fixing bosses 43 of the card reader main body 40, and is fixed to the card reader main body 40 with screws 120. A lead wire 90 is connected to a head terminal 72 in the upper part of the magnetic head 70 press-fitted into the head holder 60. This lead wire 90 is connected to the circuit unit 110 provided on the confronting side of the magnetic head 70 of the card reader main body 40.

Figure 5A:
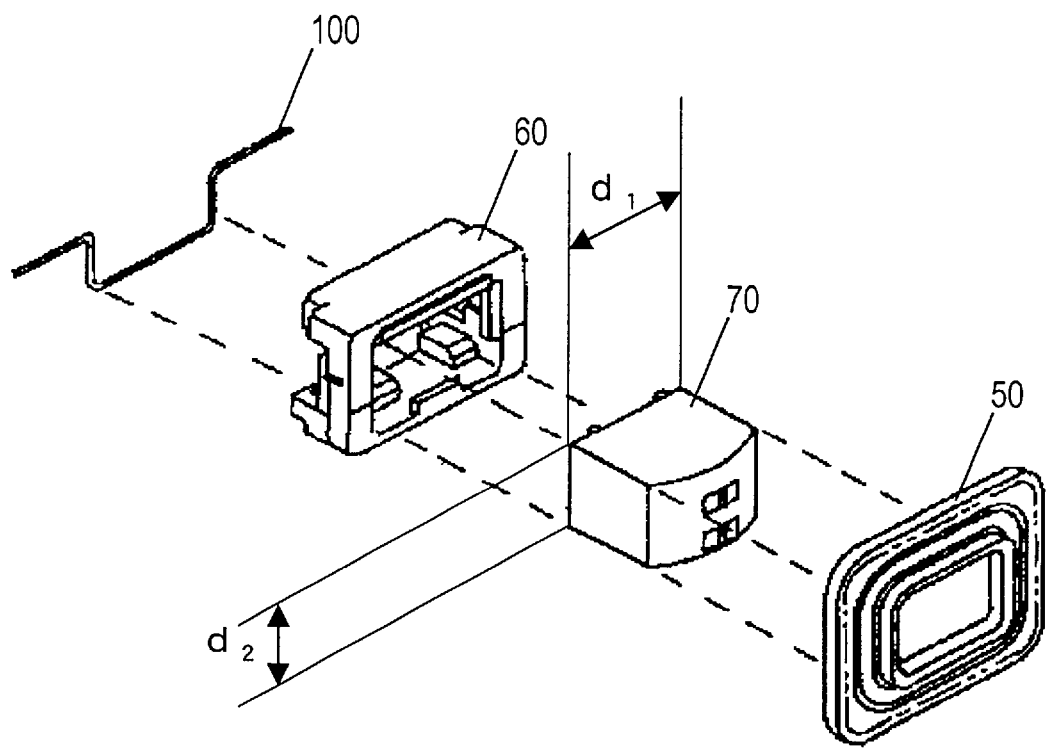
FIG. 5A is a perspective exploded view of gasket, magnetic head and head holder of the invention.
Figure 5B:
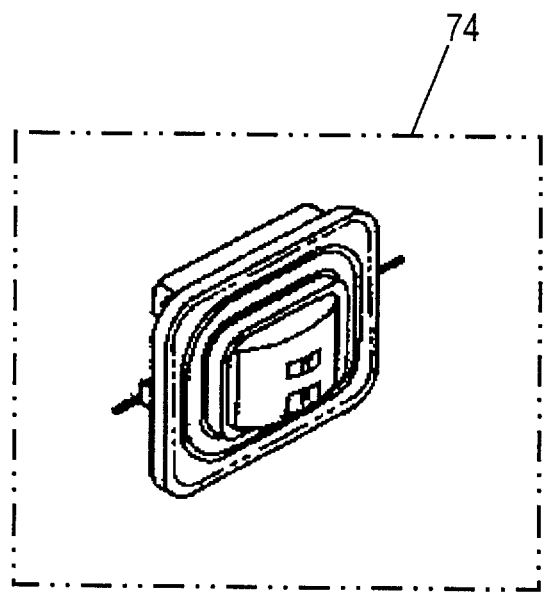
FIG. 5B is a perspective view showing an assembled state of gasket, magnetic head and head holder of the invention.

FIG. 5A is a perspective exploded view of gasket 50, magnetic head 70, and head holder 60. As shown in FIG. 5A, the spring 100, head holder 60, magnetic head 70, and gasket 50 are assembled sequentially. FIG. 5B shows the assembled magnetic head unit 74.

Figure 6:
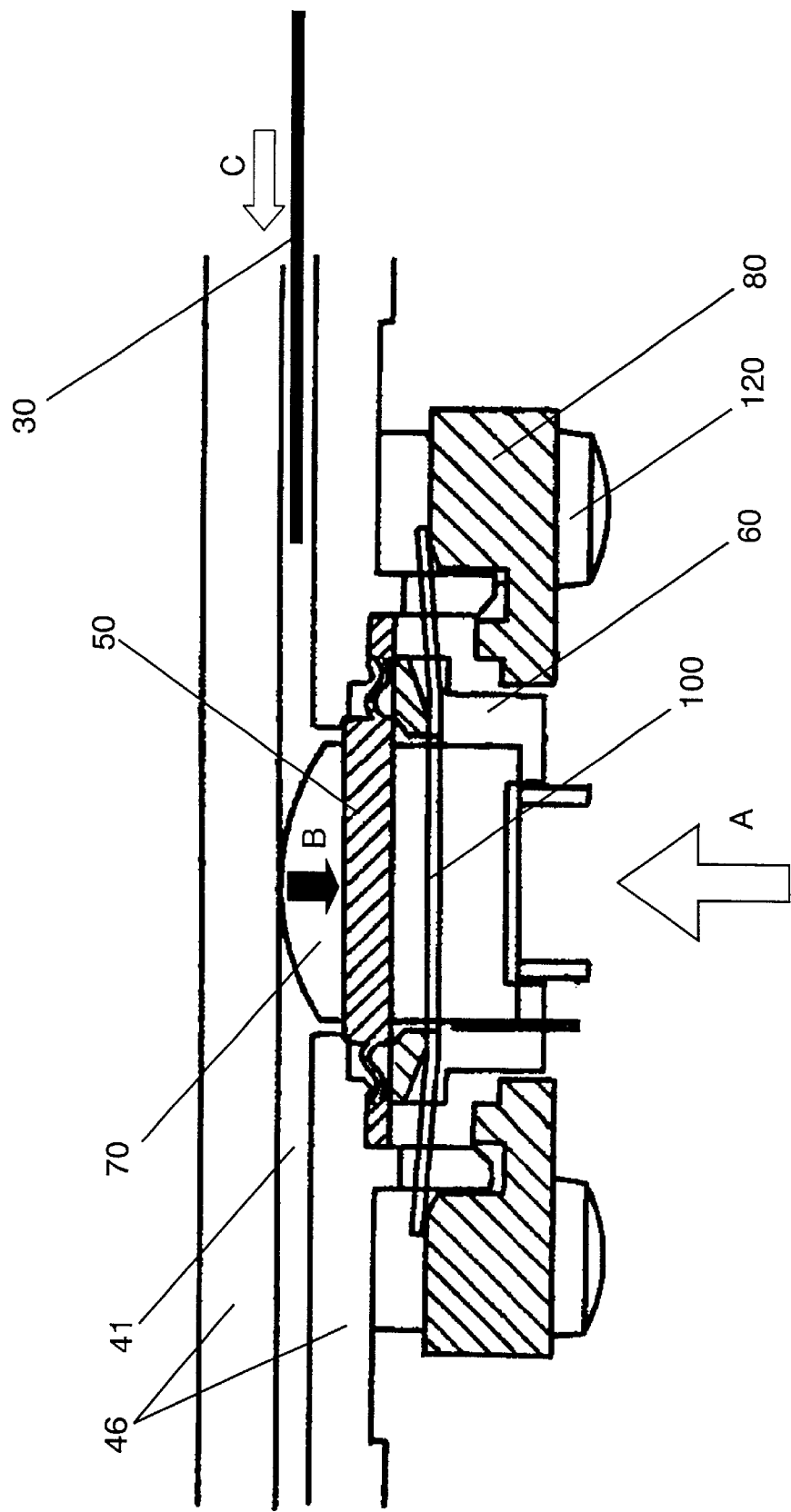
FIG. 6 is a sectional view showing the mounting of the gasket on the main body of the card reader.

FIG. 6 shows the magnetic head unit 74 mounted on the card reader main body. In this unit 74, the magnetic head 70 is inserted into the head holder 60. The head holder 60 has a spring 100 for pressing the magnetic head 70 in a direction shown by the arrow A, and the magnetic head 70 is pressed by the spring 100 at the fulcrum of the spring retainer 80.

Referring to FIG. 6, the motion of the head unit 74 is explained. When the card 30 is passed in the card passage 41 of the card reader 20 in the direction of arrow C, the magnetic head 70 installed in the center of gasket 50 reads the card data. The magnetic head 70 inserted in the head holder 60 is pressed in the direction of arrow A by the spring 100. When the card is inserted, the magnetic head 70 moves in the direction of arrow B due to the thickness of the card. Until the card is taken out after being inserted, the magnetic head 70 and card 30 are always pressed by the spring 100 in the direction of arrow A and hence slide in close contact with each other.

In the gasket 50, as shown in FIG. 4C, a folding portion 54 is provided between the periphery of the magnetic head inserting (inner circumferential) portion 53 and the outer circumferential portion 56, and the folding portion 54 is thinly formed. Therefore, the gasket 50 moves and shrinks easily by following the motion of the magnetic head 70.

When the card is not passing through the passage 41, the magnetic head inserting portion (inner circumferential portion) 53 of the gasket 50 is pressed against the peripheral edge portion 420 of the main body by the energizing force of the spring 100. Therefore, when the card does not pass through the passage 41, invasion of foreign material can be prevented by close contact between the gasket 50 and the periphery of the magnetic head 70, and close contact between the magnetic head inserting (inner circumferential) portion 53 of the gasket 50 and the peripheral edge portion 420 of the main body opening.

Further, by fastening the spring retainer 80 to the boss 43 of the main body 40 with screws, the outer circumferential portion 56 of the gasket 50 closely contacts the main body peripheral edge portion 420 of the opening. When the card passes through the passage 41, invasion of foreign material can be prevented by close contact between the gasket 50 and the periphery of the magnetic head 70, and close contact between the outer circumferential portion 56 of the gasket 50 and the main body peripheral edge portion 420 of the opening.

Figure 7A:
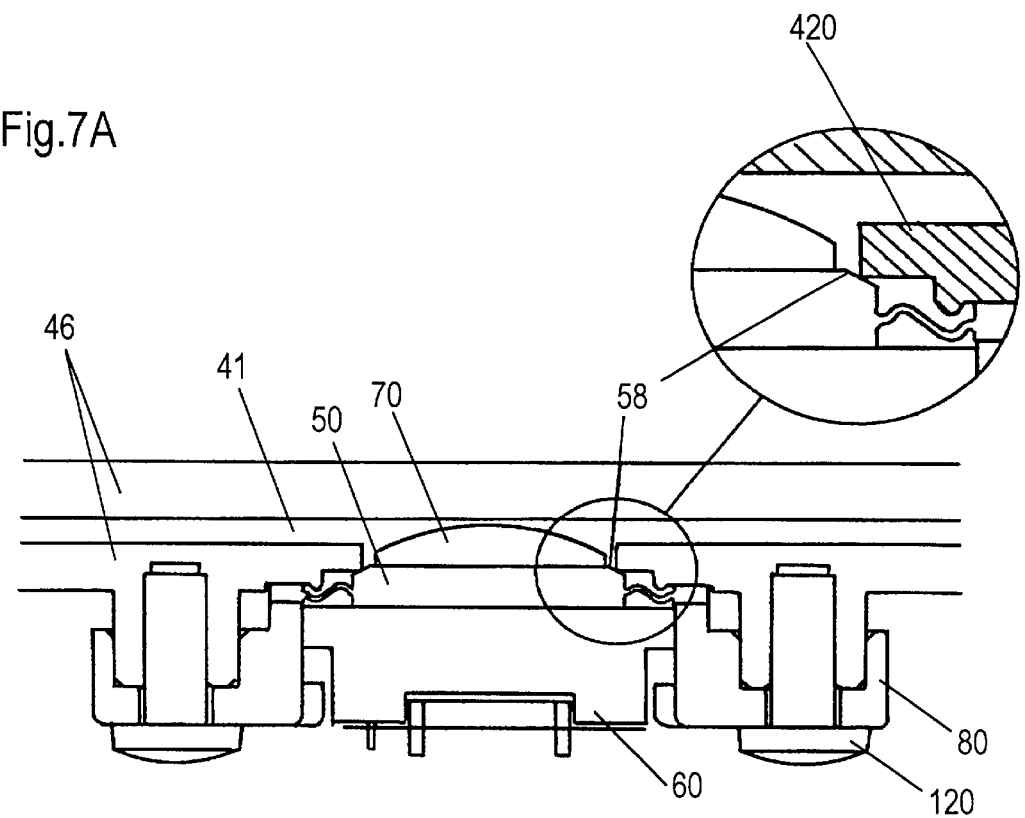
FIG. 7A is a sectional view showing the contacting portion of the invasion preventing member and the main body.
Figure 7B:
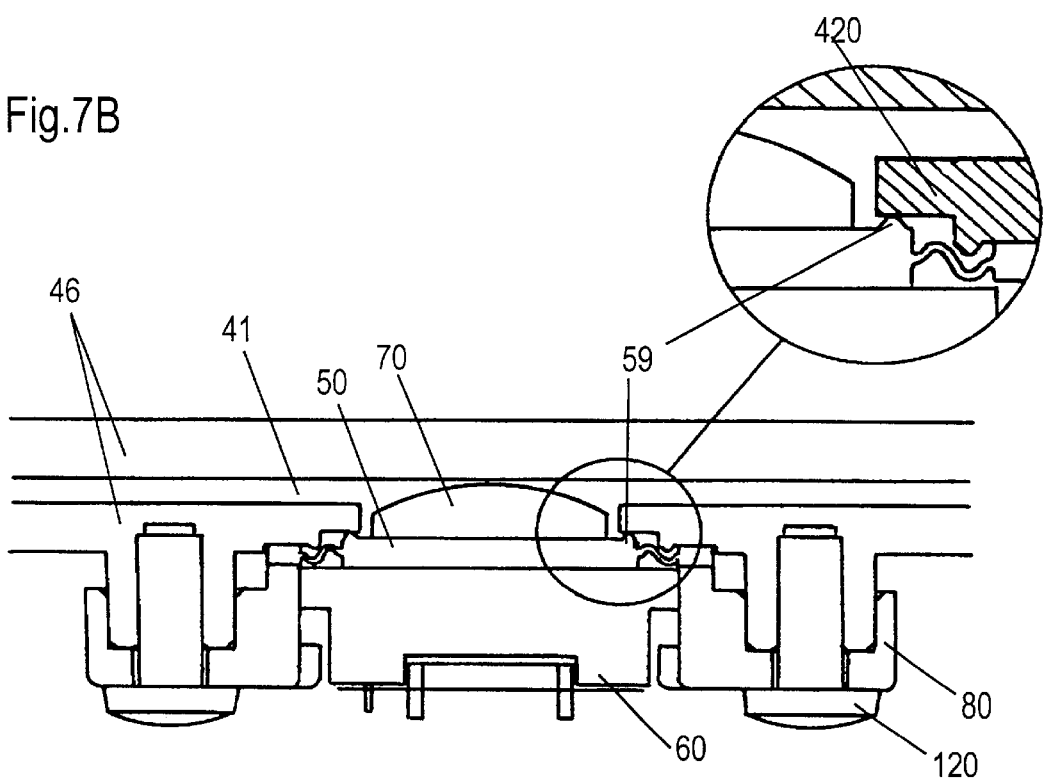
FIG. 7B is a sectional view of the contacting portion of the invasion preventing member and the main body.

FIG. 7A and FIG. 7B are sectional views showing the close contact between the main body and the invasion preventive member (i.e., gasket 50) having a slope. The opening edge 420 of the main body 40, and the magnetic head inserting portion 53 of the gasket 50 are shaped so that the gasket 50 may contact the opening edge 420 of the main body 40 in a linear manner by spring force. A slope 58 is formed in gasket 50 as shown in FIG. 7A, or a rib protrusion 59 is formed around the magnetic head inserting portion of gasket 50 as shown in FIG. 7B.

Figure 8A:
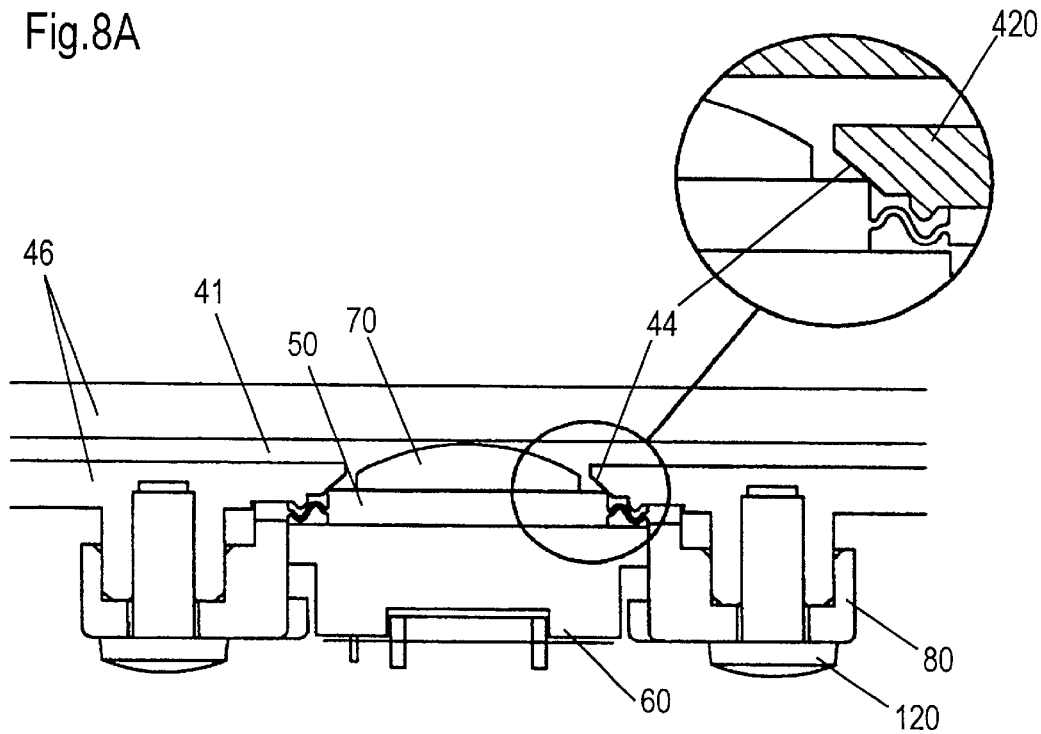
FIG. 8A is a sectional view showing a first example of the contact between the main body and the invasion preventing member.
Figure 8B:
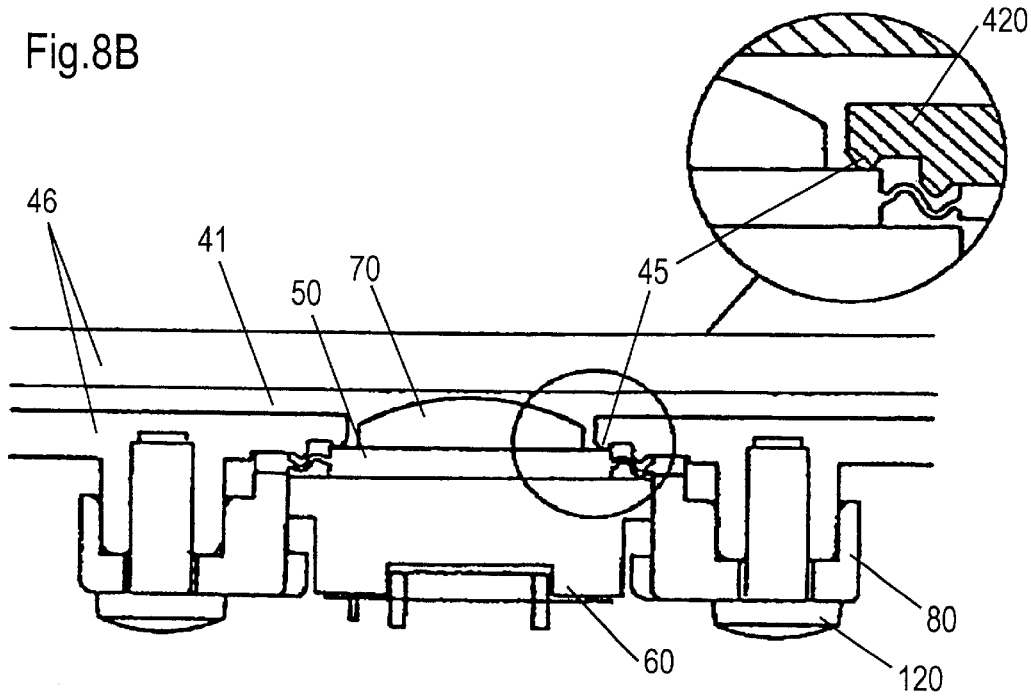
FIG. 8B is a sectional view showing a second example of the contact between the main body and the invasion preventing member.

FIG. 8A and FIG. 8B are sectional views showing the close contact between the slope of the main body and the invasion preventive member (i.e., gasket 50). In order that the gasket 50 may closely contact the main body opening edge 420 due to the spring force, a slope 44 is formed in the opening edge 420 as shown in FIG. 8A, or a rib protrusion 45 is formed in the opening edge 420 as shown in FIG. 8B.

Figure 9A:
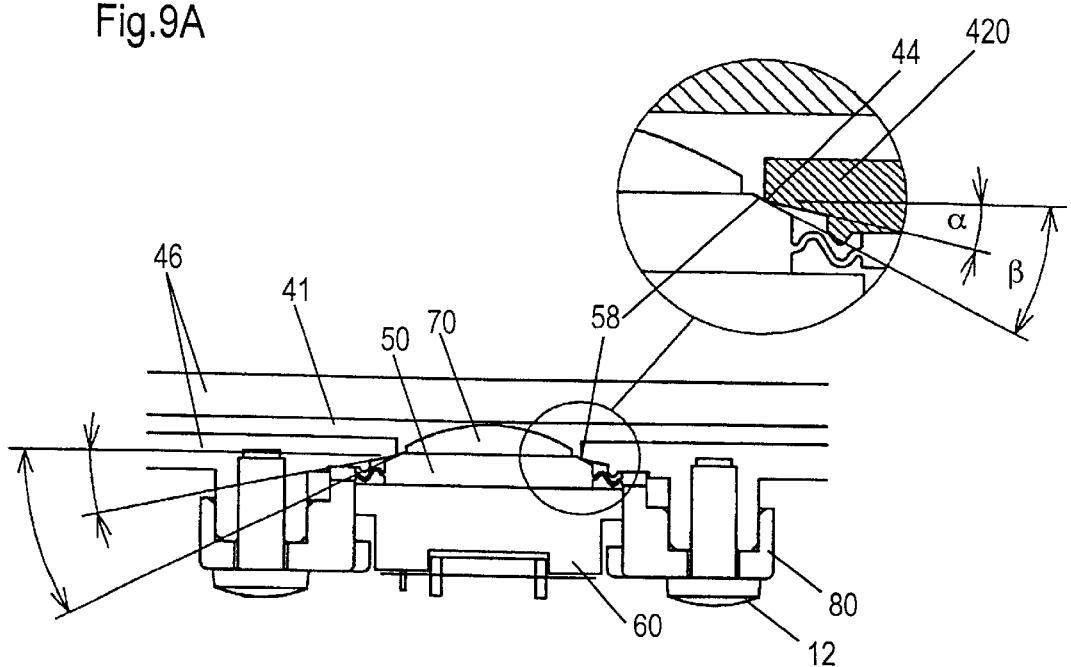
FIG. 9A is a sectional view showing a third example of the contact between the main body and the invasion preventing member.
Figure 9B:
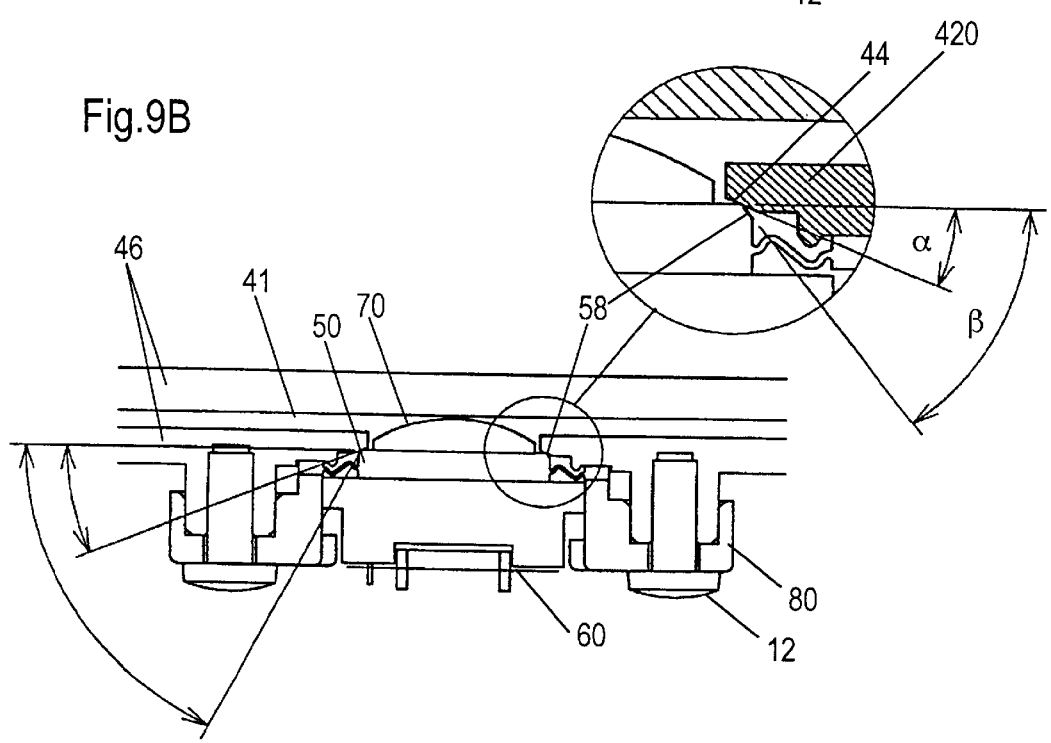
FIG. 9B is a sectional view showing a fourth example of the contact between the main body and the invasion preventing member.

FIG. 9A and FIG. 9B are sectional views showing close contact between the main body and the invasion preventing member. As shown in FIG. 9A, a slope 44 (slope angle a) is provided in the main body opening edge 420, and a slope 58 (slope angle β) is provided around the magnetic head inserting portion 53 of the gasket. These angles are set so that the slope angle α and slope angle β may differ by more than several degrees from each other. As shown in FIG. 9A, the slope angle α of the main body opening peripheral edge portion 420 is set smaller than the slope angle β of the magnetic head inserting portion 53. The dimension of the slope 44 of the main body opening peripheral edge portion 420 is set smaller than the dimension of the slope 58 of the magnetic head inserting portion 53. In this case, the main body slope 44 contacts the gasket 50 in a linear manner.

Alternatively, as shown in FIG. 9B, the slope angle α of the main body opening peripheral edge portion 420 is set smaller than the slope angle β around the magnetic head inserting (inner circumferential) portion 53. The dimension of the slope 44 of the main body opening peripheral edge portion 420 is set larger than the dimension of the slope 58 of the magnetic head inserting portion 53. In this case, the slope 58 of the magnetic head inserting portion 53 contacts the main body slope 44 in a linear manner by the energizing force of the spring 100. Both constitutions in FIG. 9A and FIG. 9B are nearly the same in the effect of preventing invasion of foreign material.

Figure 10:
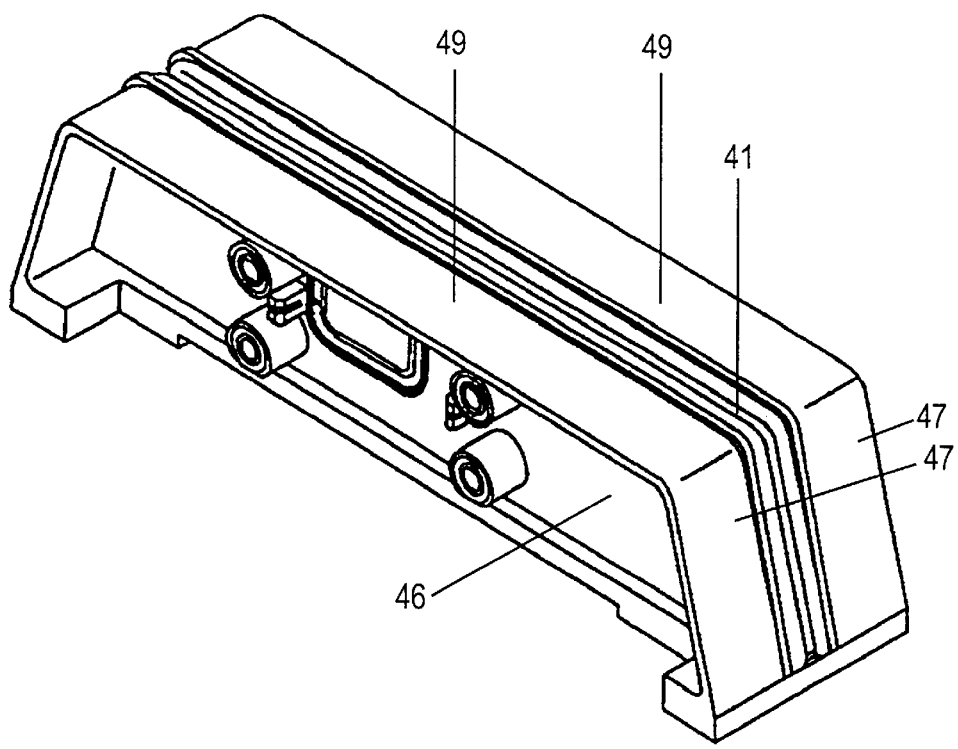
FIG. 10 is a perspective view of a flange of the main body of the invention.

FIG. 10 shows the shape of the card reader main body of the invention. In FIG. 10, flanges 49 are provided above the guide walls 46 at both sides of the card passage 41, and are linked to both end portions 47, and a slope is provided in at least one end portion 47.

Figure 11:
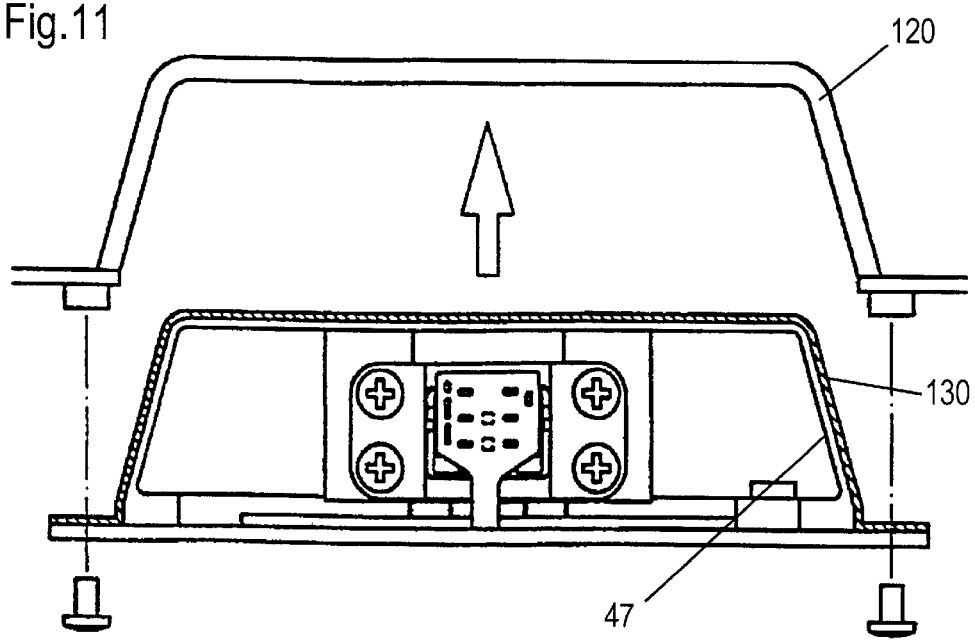
FIG. 11 is a sectional view showing a mode of adhering the card reader of the invention to an operation panel.
Figure 12:
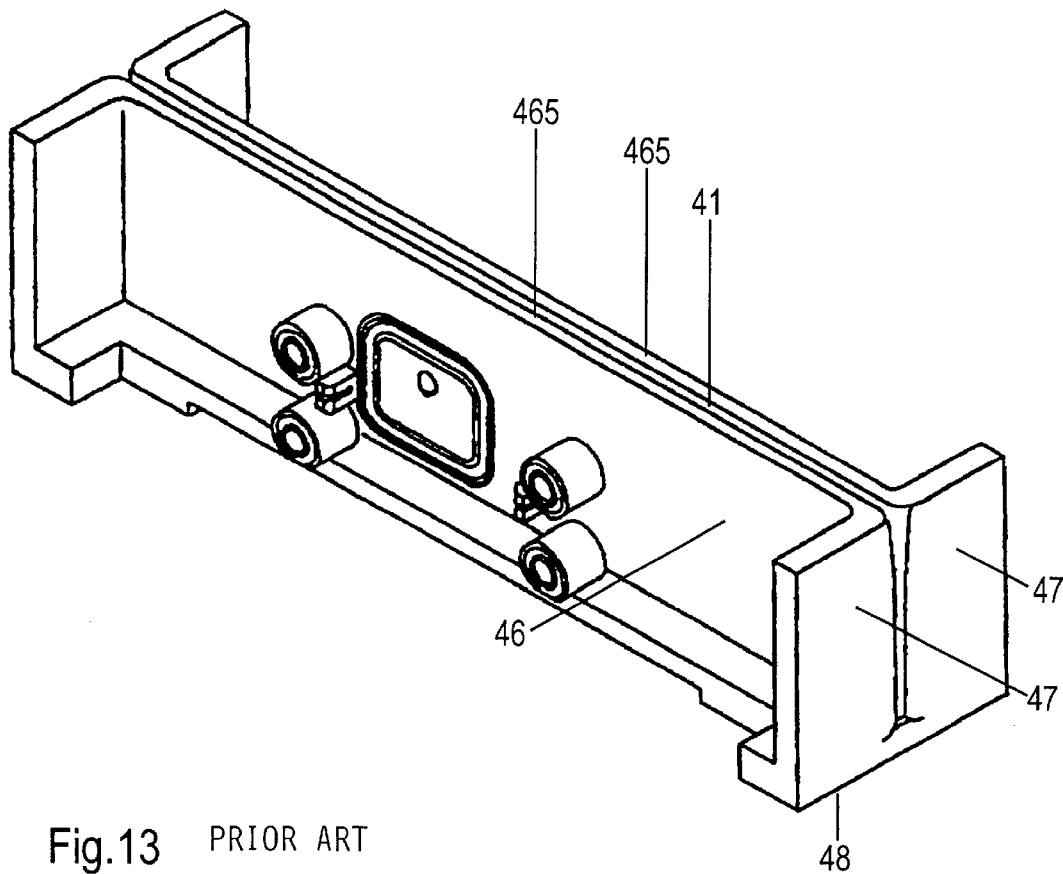
FIG. 12 is a perspective view of a flange of the main body of a conventional card reader.
Figure 13:
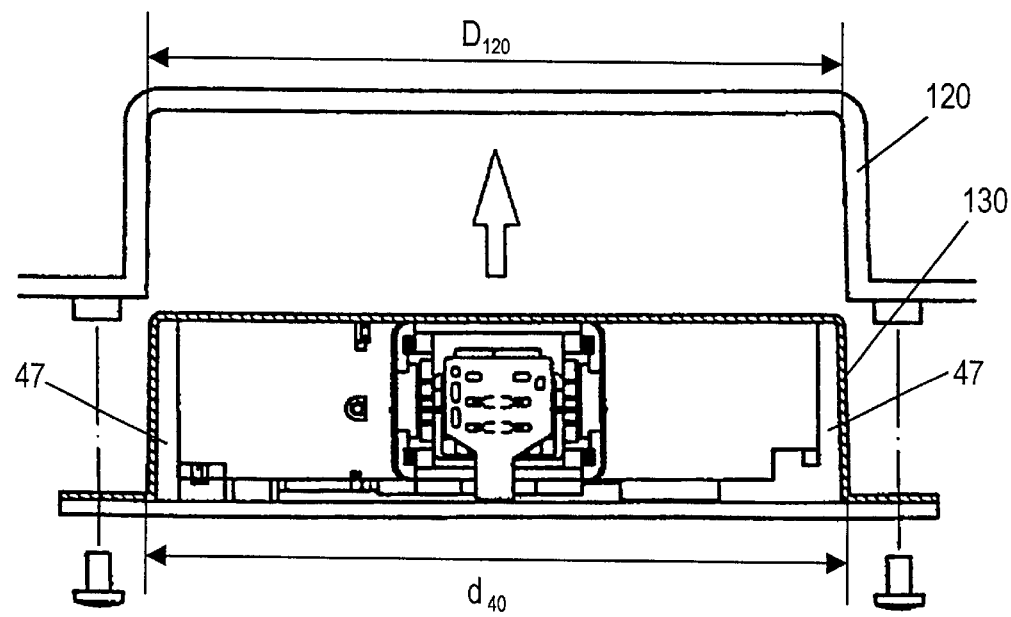
FIG. 13 is a sectional view showing a mode of adhering the conventional card reader to an operation panel.

FIG. 11 is a side view of the main body of the card reader of the invention mounted on the unit panel 120 of the operation panel 10 of an automatic vending machine shown in FIG. 3. Waterproof sheet members 130 are adhered to both end portions 47 and flanges 49 of the card reader main body, and the mode of inserting into the unit panel 120 is shown.

In FIG. 10, both end portions 47 of the card reader main body and the unit panel 120 are sloped. When mounting the card reader main body 40 on the unit panel 120, the waterproof sheet 130 adhered to the card reader main body 40 can be placed in close contact with the unit panel 120. Therefore, invasion of foreign material from this area can be prevented.

As clear from the description herein, the card reader of the invention can prevent invasion of water or dust into the magnetic head through the card passage of the main body by the invasion preventive member provided on the circumference of the magnetic head.

In the card reader of the invention, by lightly pressing the magnetic head into the invasion preventive member, the magnetic head is allowed to swing freely while preventing invasion of foreign material, so that the card can be read securely.

The card reader of the invention has a folding portion provided in the invasion preventive member so that the invasion preventive member can follow the motion of the magnetic head easily, and thereby the card can be read securely.

In the card reader of the invention, at least part of the invasion preventive member is formed thinly, and the elasticity is improved, so that the invasion preventive member can follow up the motion of the magnetic head easily, and thereby the card can be read securely.

In the card reader of the invention, when the card is not passing through the card passage of the main body, the invasion preventive member is always coming in contact with the main body with a specific pressure (because the spring is always pushing against the magnetic head), thereby consistently preventing invasion of foreign material. In the card reader of the invention, the slope of the magnetic head inserting portion of the invasion preventing member contacts the main body in a linear manner, and the surface pressure is increased as compared with the case of surface contact. Therefore, invasion of foreign material can be prevented securely.

In the card reader of the invention, the slope in the contacting portion of the opening edge linearly contacts the invasion preventing means at its rib leading end, and it is likely to be crushed. Therefore, invasion of foreign material can be prevented securely.

In the card reader of the invention, the slope of the opening edge linearly contacts the slope of the invasion preventing member, so that invasion of foreign material can be prevented securely.

In the card reader of the invention, moreover, since flanges are provided in the upper part of the card passage of the main body, it is easier to adhere the waterproof sheets closely to the unit panel at the flange side.

The adhering area of the waterproof sheet is wide, and the adhesion is increased, so that invasion of foreign material can be prevented securely. Moreover, since the flanges are wide, the creeping distance from the card passage to the circuit unit is increased, and the resistance to static electricity from the card is increased.

In the card reader of the invention, when adhering waterproof sheets to an area other than the card passage of the main body, it can be easily adhered to the unit side cover. Therefore, working problems such as peeling and tearing of the waterproof sheet can be avoided.

What is claimed is:

1. A card reader comprising:

a magnetic head for reading information recorded on a magnetic card;

a main body including a mounting surface and a card passage formed of guide walls for guiding the magnetic card to be slid through said card passage, each of said guide walls being substantially perpendicular to said mounting surface, a first one of said guide walls having a central opening for receiving said magnetic head;

a head holder holding said magnetic head and including a spring for biasing said magnetic head against the magnetic card to be slid through said card passage such that said magnetic head can read information recorded on the magnetic card;

a gasket including an inner circumferential portion and an outer circumferential portion, a front portion of said magnetic head held by said head holder being press-fit into an opening in said inner circumferential portion of said gasket; and a spring retainer arranged so as to hold said gasket between said first one of said guide walls and said spring retainer and around a periphery of said magnetic head;

wherein said first one of said guide walls, said head holder holding said magnetic head, said gasket, and said spring retainer are arranged such that when the magnetic card is not in said card passage, said inner circumferential portion of said gasket is in a sealing position so as to contact a peripheral edge portion of said central opening of said first one of said guide walls due to a biasing force of said spring, and such that when the magnetic card is in said card passage, said outer circumferential portion of said gasket is sandwiched between said peripheral edge portion of said central opening and said spring retainer so as to isolate an interior of the card reader from an exterior of the card reader.

2. The card reader of claim 1, wherein said spring comprises a bar-shaped spring.

3. The card reader of claim 1, wherein said head holder is coupled to an outer circumferential surface of said magnetic head.

4. The card reader of claim 1, wherein said gasket is substantially flat.

5. The card reader of claim 1, wherein said gasket has a folding portion between said inner circumferential portion and said outer circumferential portion.

6. The card reader of claim 5, wherein said folding portion includes at least a portion having a thinner thickness relative to said inner circumferential portion and said outer circumferential portion.

7. The card reader of claim 5, wherein said folding portion is flexible so as to allow movement of said inner circumferential portion between said sealing position when the magnetic card is not in said card passage, and a non-sealing position when the magnetic card is in said card passage, wherein in said non-sealing position, said inner circumferential portion of said gasket is not in contact with said peripheral edge portion of said central opening.

8. The card reader of claim 5, wherein said outer circumferential portion comprises a rib.

9. The card reader of claim 1, wherein at least one of said inner circumferential portion of said gasket and said peripheral edge portion of said central opening has an angled contact surface with respect to an axis of said card passage such that contact between said inner circumferential portion of said gasket and said peripheral edge portion of said central opening comprises linear contact.

10. The card reader of claim 1, wherein one of said inner circumferential portion of said gasket and said peripheral edge portion of said central opening includes a circumferential rib protrusion such that contact between said inner circumferential portion of said gasket and said peripheral edge portion of said central opening comprises linear contact.

11. The card reader of claim 1, wherein an upper part of said card passage of said main body includes a flange.

12. The card reader of claim 1, wherein said card passage of said main body has end faces, at least one of said end faces being sloped.

13. The card reader of claim 1, further comprising a unit panel and a waterproof sheet adhered to said main body between said main body and said unit panel.

14. The card reader of claim 1, wherein said card passage of said main body has open end faces on opposite ends of said card passage such that the magnetic card can be slid into a first one of said end faces, through said card passage, and out of a second one of said end faces.

* * * * *